ns Cl ... 198/146; 198/148
United States Patent [19]
Feehery, Jr.

[11] 3,944,056
[45] Mar. 16, 1976

[54] PIVOTED BUCKET CONVEYOR
[75] Inventor: William J. Feehery, Jr., Havertown, Pa.
[73] Assignee: Campbell Soup Company, Camden, N.J.
[22] Filed: Oct. 11, 1974
[21] Appl. No.: 514,088

Related U.S. Application Data
[63] Continuation-in-part of Ser. No. 461,602, April 17, 1974, abandoned.

[52] U.S. Cl. ............................... 198/146; 198/148
[51] Int. Cl.² ................................... B65G 17/16
[58] Field of Search ......... 198/146, 145, 147, 140, 198/38, 148–152, 12; 209/74; 214/11 R, 62 R

[56] References Cited
UNITED STATES PATENTS

| 630,805 | 8/1899 | Decker | 198/146 |
|---------|--------|--------|---------|
| 675,156 | 5/1901 | Hoshor | 198/146 |
| 3,055,486 | 9/1962 | Meyer | 198/145 |

FOREIGN PATENTS OR APPLICATIONS

| 438,112 | 12/1926 | Germany | 198/146 |

Primary Examiner—Robert J. Spar
Assistant Examiner—James M. Slattery
Attorney, Agent, or Firm—John W. Logan, Jr.

[57] ABSTRACT

A pivoted bucket conveyor is disclosed in which pivotally mounted buckets carried by a chain conveyor is provided with the buckets normally arranged to travel in a horizontal position across a reject station and, upon receipt of a signal from an inspection station, to pivot and discharge their contents at the reject station. A flexible bucket guide member is provided at the reject station to engage beneath projections on the sides of the buckets and guide the buckets across the reject station. Pins carried by a second chain conveyor engage and support the flexible bucket guide member at points between each bucket and permit the flexible guide member to be deflected upon dumping of a bucket at a position beneath the bucket being dumped and still direct movement of adjacent buckets. Modified forms of guide members are also disclosed to stabilize and direct movement of all buckets other than the particular bucket being pivoted or dumped.

22 Claims, 16 Drawing Figures

PIVOTED BUCKET CONVEYOR

This application is a continuation-in-part of my copending application, Ser. No. 461,602, filed Apr. 17, 1974, and now abandoned.

The present invention relates to new and useful improvements in pivoted bucket conveyors and more particularly to the provision of novel stabilizing means to guide pivotal buckets of a bucket conveyor in a positive manner past a reject station to prevent tilting or rocking of those buckets which are to pass the reject station without being dumped and to the provision of novel dumping means at the reject station to permit dumping of selected buckets.

Pivoted bucket conveyors of this type disclosed herein are used to carry the product past an inspection station where the product is inspected. If the product passes inspection the product continues on to the end of the conveyor line and is transferred to further processing apparatus. However, if the product in a particular bucket on the conveyor does not pass inspection a signal by the inspection station is sent to a reject station and that bucket is dumped at the reject station. Rigid guide rails normally are provided to guide movement of the buckets and to maintain the buckets in a horizontal position during passage along the upper run of the conveyor. These guide rails are interrupted at the reject station so that the buckets may be rotated and dumped at the reject station. In conventional apparatus of this type there is no satisfactory means to maintain the buckets in a stable position as they pass the reject station and if the buckets contain liquid material there will be some spillage of the liquid from the buckets when the buckets which are not to be dumped pass over the reject station.

With the foregoing in mind, a primary object of the present invention is to provide a novel pivoted bucket conveyor including stabilizing means to guide the pivoted buckets of the conveyor in a positive manner past the rejection station to prevent tilting or rocking of those buckets which are to pass the reject station without being dumped.

Another object of the present invention is to provide novel stabilizing means for a pivoted bucket conveyor which will permit dumping of one bucket passing a reject station and simultaneously stabilize the immediate adjacent buckets.

A further object of the present invention is to provide novel dumping means for buckets of a pivoted bucket conveyor in which the stabilizing means for the buckets also aid in moving the bucket toward and away from the dump or discharge position.

Another object of the present invention is to provide novel stabilizing means for a pivoted bucket conveyor including a flexible stabilizer which serves to aid in dumping of the bucket at the reject station and further aids in returning the bucket to its upright position after it is dumped.

A still further object of the present invention is to provide a novel stabilizer for pivoted bucket conveyors having the features and characteristics set forth above which is easy to manufacture and maintain and which may be readily applied to existing pivoted bucket conveyors.

These and other objects of the present invention and the various fetures and details of the operation and construction thereof are hereinafter more fully set forth and described with reference to the accompanying drawings, in which:

Figure 1:
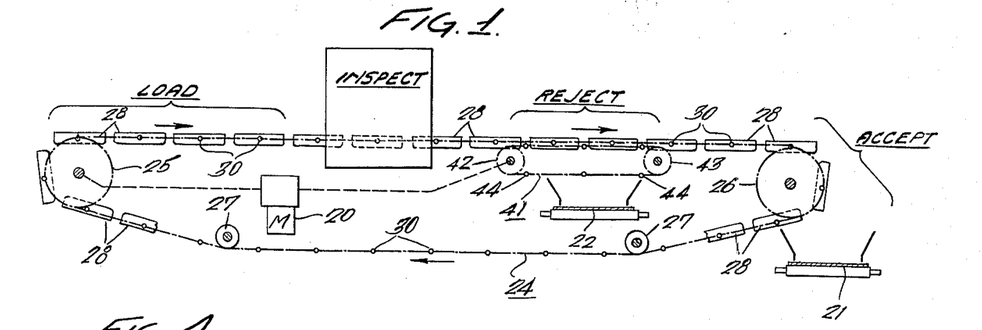
FIG. 1 is a schematic side elevational view of a pivoted bucket conveyor incorporating the stabilizing means of the present invention.

Referring more specifically to the drawings, FIG. 1 illustrates schematically a pivoted bucket conveyor incorporating the stabilizing means and reject mechanism of the present invention. As shown in FIG. 1, the upper run of the conveyor travels continuously from left to right being driven by an electric motor 20. At the extreme left-hand end of the conveyor mechanism there is a loading station where the product to be inspected or otherwise observed is loaded into buckets of the conveyor. Thereafter the product passes through an inspection station where the product in the buckets of the conveyor is inspected. If the product passes inspection it is carried on to the end of the conveyor where it is dumped or transferred to conveying means 21 which will carry the product to some further product treating station. If the product in a particular bucket of the conveyor does not pass inspection that bucket is dumped at a reject station positioned intermediate the inspection station and the end of the conveyor on to conveying means 22 which may convey the product back to a treating station.

The bucket conveyor itself includes a pair of spaced parallel endless chains 23 and 24 which pass over sprockets 25 and 26 at opposite ends of the conveying line. If desired, idler sprockets 27 may be provided to guide and tension the lower run of the chains 23 and 24. The motor 20 is drivably connected to the shaft for the sprockets 25 in any suitable manner to cause predetermined uniform travel of the chains 23 and 24.

Figure 3:
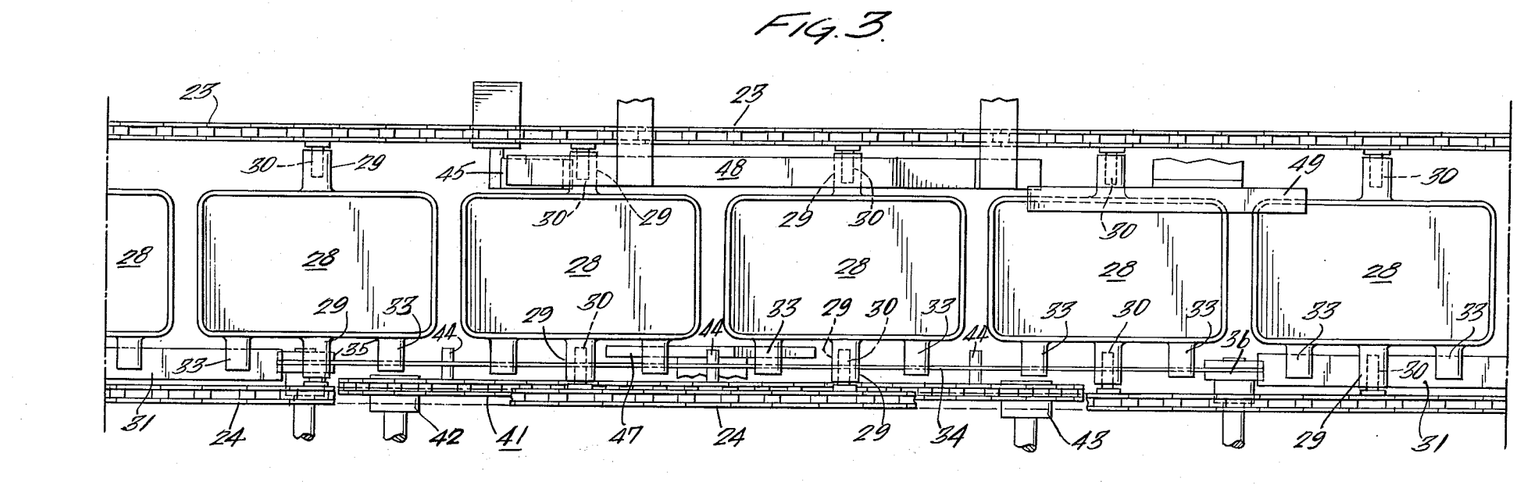
FIG. 3 is a plan view of the mechanism illustrated in FIG. 2.
Figure 4:
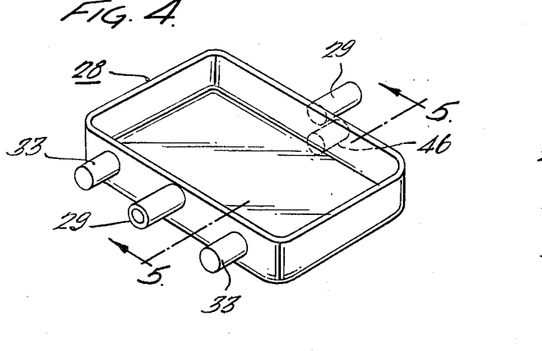
FIG. 4 is a perspective view of a bucket for the pivoted bucket conveyor.
Figure 5:
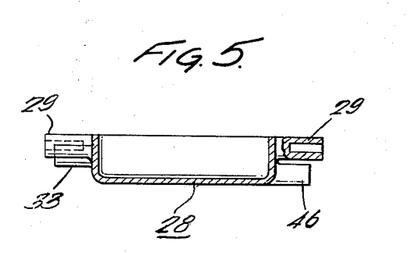
FIG. 5 is a transverse sectional view taken along line 5—5 of FIG. 4.

Extending between the chains 23 and 24 of the conveyor and pivotally carried thereby are a series of buckets or shallow trays 28 formed as shown in FIGS. 4 and 5 of the drawings. These buckets are relatively shallow, open at the top and closely spaced together along the entire length of the conveyor. Each bucket has a pair of oppositely disposed mounting lugs 29 thereon which project outwardly from the mid-point of the upper edges of the bucket side walls. These mounting lugs 29 engage over corresponding bucket support pins 30 which project inwardly from the conveyor chains 23 and 24 as shown in FIG. 3 to pivotally mount the buckets between the chains.

Figure 2:
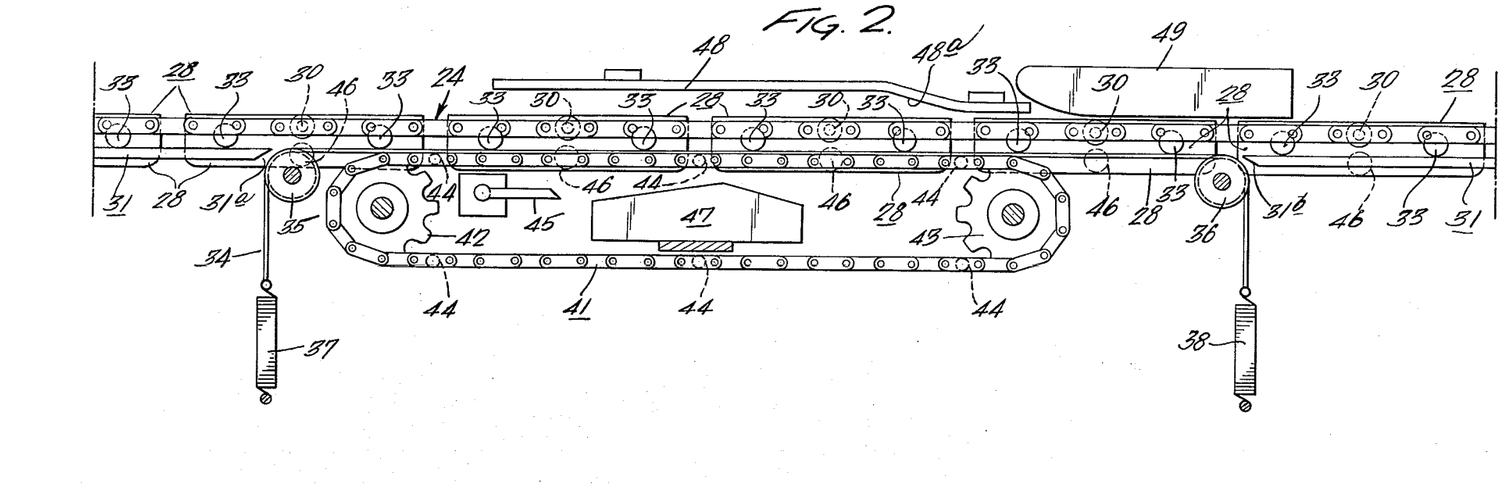
FIG. 2 is a fragmentary side elevational view illustrating the stabilizing means of the present invention in position adjacent the upper run of a pivoted bucket conveyor.

During the normal course of travel of the buckets along the upper run of the conveyor, the buckets are guided along a horizontal path and prevented from tilting by a flat guide rail 31 which extends in a horizontal direction inwardly of and slightly below the chain 24. This guide rail 31 is engaged by a pair of bucket guide pins 33, 33, projecting outwardly from the front and rear portions of the side edge of the bucket nearest the guide rail 31 and the conveyor chain 24. As shown in FIGS. 2 and 3, the guide rail 31 is interrupted between the points 31a and 31b at the reject station. The purpose of this is to permit disengagement of the bucket guide pins from the guide rail to allow dumping of the bucket by pivotal movement of the bucket about the axis of the mounting lugs 29, 29 at the reject station.

In accordance with the embodiment of the invention shown in FIGS. 1 to 12, means are provided to engage the bucket guide pins 33, of the bucket and guide movement of the bucket across the gap between the ends of the guide rails 31a and 31b at the reject station to prevent tipping of the buckets at the reject station unless the reject mechanism is actuated. To this end, a flexible cord 34 is positioned to span between ends 31a and 31b of the guide rail with the upper edge of the cord 34 at the same level as the upper edge of the guide rail 31. Thus, where the guide rail terminates at the reject station the fexible cord 34 takes over to serve as a temporary guide for the buckets.

As shown in FIG. 2, the guide cord 34 passes over a pair of guide rollers 35 and 36 at opposite ends of the interruption in the guide rail 31 with the cord thereafter passing downwardly below the guide rollers 35 and 36 and having its opposite ends connected to coil springs 37 and 38 anchored to the frame of the conveyor mechanism. Thus, if the guide cord 34 is deflected by a bucket being dumped, as more fully described hereafter, the deflection of the guide cord will merely cause an extension of the springs 37 and 38 and the springs 37 and 38 will tend to return the segment of the guide cord between the guide rollers 35 and 36 to its straight horizontal position. Instead of using a pair of springs 37 and 38 it may be desirable to use only one spring. In the alternative the guide cord itself may be elastic and anchored directly to the terminal ends 31a and 31b of the guide rail, or a combination of elastic cord and springs may be used as desired.

To prevent the entire span of the cord between the ends 31a and 31b of the guide rail from being deflected downwardly when a bucket is dumped at the reject station, means are provided intermediate adjacent buckets to hold and support the cord. To accomplish this, an endless chain 41 passing over sprockets 42 and 43 is provided at the reject station with the upper run of the endless chain 41 positioned just below and inwardly of the conveyor chain 24, as shown in FIGS. 2 and 3. This endless chain is driven by the main conveyor drive motor 20 so that the upper run of the chain 41 travels in the same direction and at the same speed as the conveyor chain 24. The endless chain 41 carries a plurality of support pins 44 extending in a horizontal direction and projecting inwardly of the chain toward the center of the conveying mechanism. These support pins 44 engage the underneath side of the cord 34 intermediate each bucket at the reject stataion and travel along between the buckets supporting the cord 34 at points between each bucket at the reject station. When a bucket is dumped and the cord beneath that bucket is deflected downwardly as descried hereafter, the support pins 44 prevent the deflection of the cord beneath the single bucket being dumped from affecting the stability of the adjacent buckets.

Figure 6:
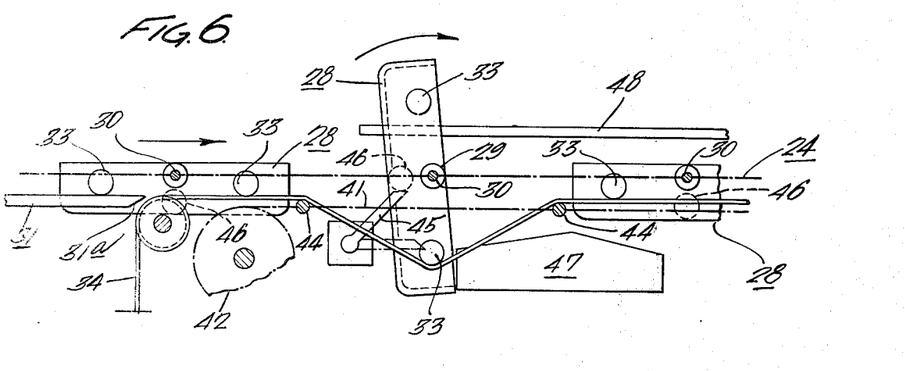
FIGS. 6 to 10 inclusive are schematic longitudinal sectional views through the pivoted bucket conveyor illustrating the operation of the stabilizing means and showing the various stages in dumping a bucket and returning a bucket to its upright position at the reject station of a pivoted bucket conveyor incorporating the stabilizing means and dump mechanism of the present invention.
Figure 7:
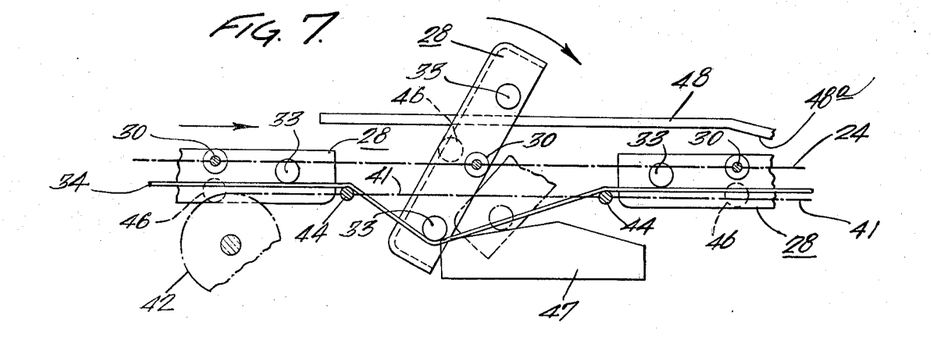

Dumping of the individual buckets is effected by a dump lever 45 whose position is controlled by a signal from the inspection station. The dump lever is normally held in a horizontal position as shown in FIG. 2 of the drawings in which it will not affect the position of the buckets passing the reject station and, upon receipt of a signal from the inspection station will move to an upwardly deflected position into engagement with a dumping lug 46 projecting outwardly from a point on the bucket beneath the mounting lug 29 at the opposite side of the bucket from the guide pins 33. The dump lever is positioned beneath and inwardly of the conveyor chain 23 and is carried by a movable shaft for movement from the horizontal non-dump position to its upwardly deflected dumping position, as shown in FIG. 6. When the product in a bucket passing the inspection station is not acceptable a delayed signal is given by the inspection station which will cause the lever to be rotated upwardly on its shaft approximately 45° at a time when that product which did not pass inspection arrives at the lever 45. The lever 45 will then engage the dumping lug 46 of that bucket to initiate dumping of the bucket and thereafter will return to its horizontal position out of the path of travel of the dumping lugs of succeeding buckets.

FIGS. 6–10 inclusive of the drawings illustrate successive steps in dumping and returning to its horizontal position a bucket at the reject station. As shown in FIG. 6, the dump lever 45 has been rotated to its dump position in response to a signal from the inspection station to dump a bucket 28 at the reject station. As the bucket 28 approaches the dump lever the dump lever engages the dumping lug 46 of the bucket causing the bucket to pivot clockwise about its mounting lugs 29 to the position as shown in FIG. 6 in which the bucket is in substantially a vertical position. Continued forward movement of the bucket conveyor will move the bucket to a position in which the forward guide pin 33 of the bucket 28 is in engagement with the leading edge of a dump cam 47 mounted adjacent and slightly below the conveyor chain 24 at the opposite side of the bucket 28 from the dump lever 45. As the guide pin 33 contacts the leading edge of the dump cam 47 the dumping lug 46 goes out of contact with the dump lever 45 and the dump lever is returned to its normal horizontal position. As shown in FIG. 6 upon dumping of the bucket 28 the guide cord 34 is depressed between adjacent cord guide pins 44 at the bucket being dumped but is not deflected beneath either of the adjacent buckets.

Figure 8:
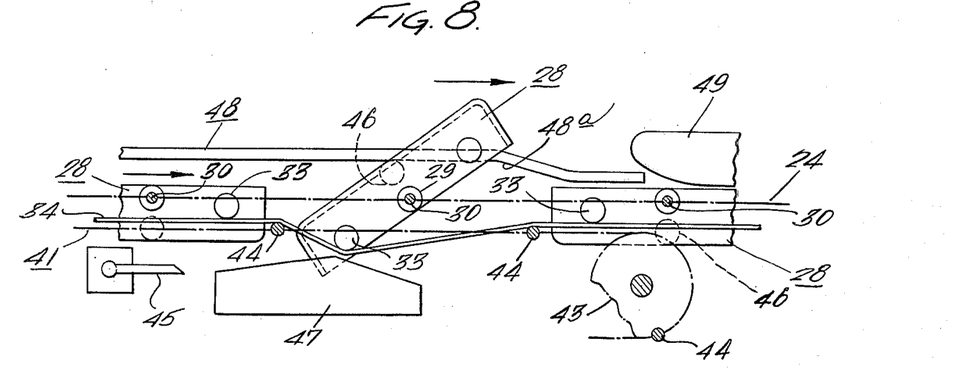
Figure 9:
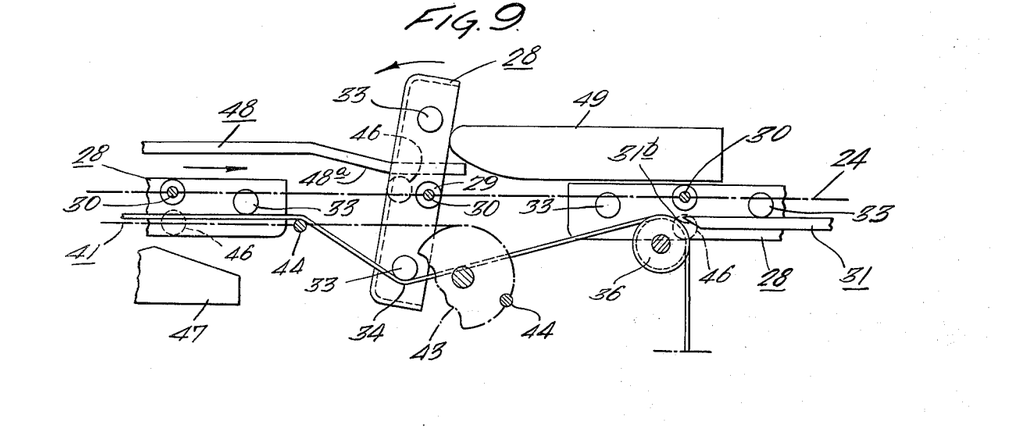
Figure 10:
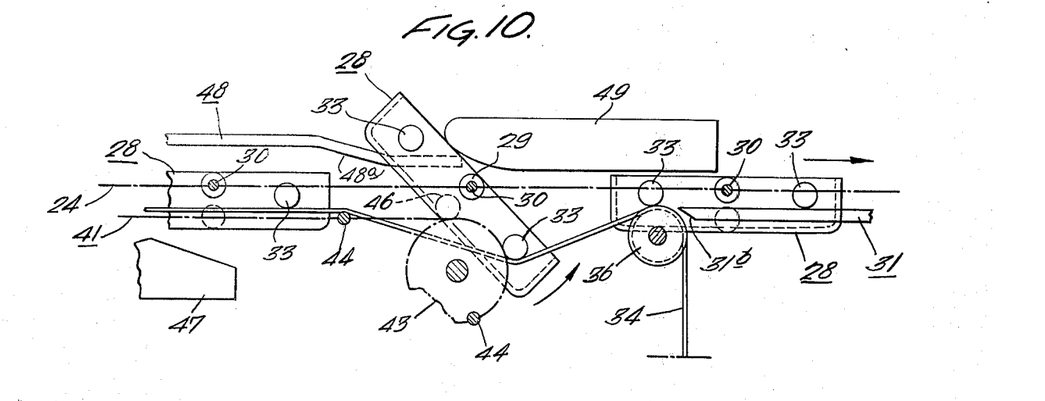

Further continued movement of the bucket conveyor will cause the bucket guide pin 33 to ride up the upper surface of the dump cam 47 causing the bucket 28 to rotate further beyond its vertical position to the position as shown in FIG. 8 at which time the contents of the bucket 28 are dumped onto the reject conveyor 22. In this position of the bucket being dumped, the cord springs 37 and 38 will cause the cord 34 to force the leading bucket guide pin 33 upwardly to a position in which the dumping lug 46 on the bucket is in engagement with the lower surface of a bucket return rail 48. The bucket will continue to ride along in this position until the dumping lug 46 of the bucket reaches the downwardly sloping portion 48a of the bucket return rail 48. At this point the downwardly sloping portion of the bucket return rail will start pivoting the bucket counter-clockwise toward its original horizontal position. As the bucket reaches approximately a vertical position the side wall of the bucket engages the nose of a bucket return guide member 49, as shown in FIG. 9. Further continued movement of the bucket conveyor will cause the bucket to be forced back toward its original horizontal position as shown in FIG. 10 at which time the dumping operation of the bucket has been completed. The side wall of the bucket which has been dumped will then ride under the lower guiding surface of the bucket return guide member 49 which will direct movement of the bucket in a horizontal position until the bucket again reaches the bucket guide rail 31.

Figure 11:
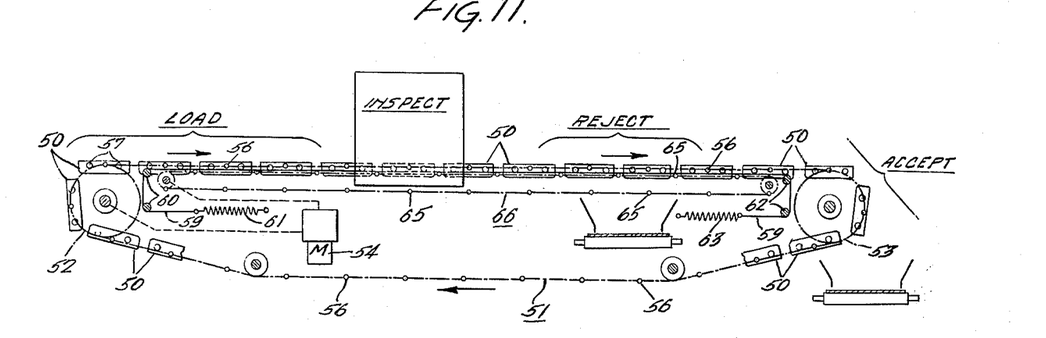
FIG. 11 is a schematic side elevational view illustrating a modified form of stabilizing means of the present invention.
Figure 12:
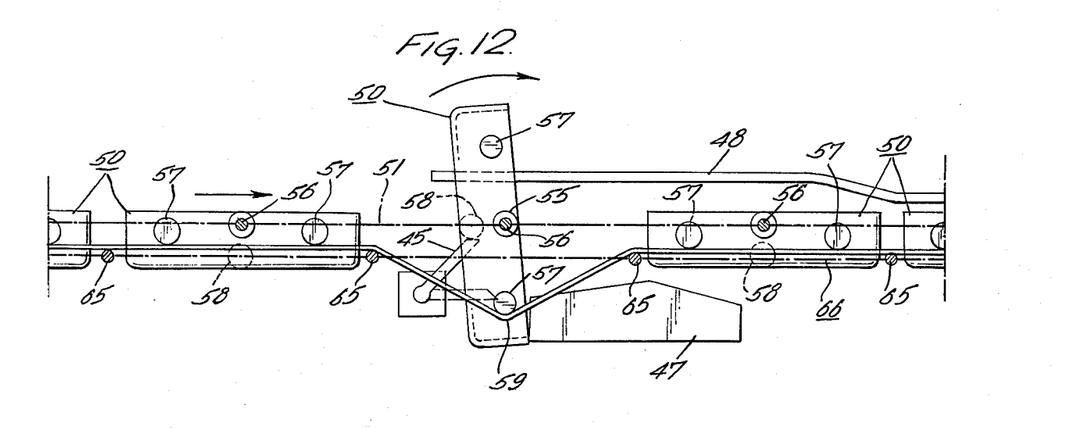
FIG. 12 is an enlarged fragmentary side elevational view of the apparatus of FIG. 11.

FIGS. 11 and 12 illustrate a modified form of the bucket guiding and stabilizing means of the present invention. In this form of the invention the rigid guide rails 31 of the prior embodiment are not required to guide movement of the buckets toward and away from the reject station. As illustrated in FIG. 11, the bucket conveyor includes a series of buckets 50 carried by spaced parallel conveyor chains 51 which pass over sprockets 52 and 53 at opposite ends of the bucket conveyor. A drive motor 54 is provided to drive the forward sprocket 52. The upper run of the conveyor carries the buckets 50 in straight line past the loading, inspection, reject, and accept stations. This arrangement of handling the product in the buckets is the same as that shown in the embodiment of FIG. 1.

As illustrated in FIG. 12, the buckets 50 have mounting lugs 55 projecting out of opposite sides of the buckets which pivotally mount the buckets on mounting pins 56 carried by and projecting inwardly from the spaced parallel conveyor chains 51. Also, bucket guide pins 57, 57 project outwardly from the front and rear of one side of the buckets to engage the bucket guiding and stabilizing means more fully described hereinafter. Each bucket also has a dumping lug 58 similar to the aforementioned dumping lug 46 of the buckets 28 which may be engaged by dumping mechanism exactly the same as the dumping mechanism shown in the embodiment of FIGS. 1 to 10 inclusive of the drawings and which includes the movable dump lever 45, the dump cam 47 and the bucket return rail 48.

In accordance with this embodiment of the present invention, during normal movement of the buckets 50 along the upper run of the bucket conveyor the buckets are guided and normally maintained in a horizontal position by means of a flexible guide cord 59 which engages under the front and rear guide pins 57, 57 of each of the buckets. The flexible guide cord 59 extends in a horizontal direction form the forward sprocket 52 to the rearward sprocket 53, as shown in FIG. 11 and thus guides the buckets during their entire movement from the loading section to the acceptance station. At the loading end of the bucket conveyor, the guide cord 59 passes over a pair of guide rollers 60, 60 and then has its forward terminal end anchored to a spring 61. Similarly, at the opposite end of the bucket conveyor the guide cord 59 passes over a pair of guide rollers 62, 62 and has its terminal end anchored to a spring 63. As set forth previously, instead of the pair of springs 61, 63, a single spring may be used. In the alternative the guide cord itself may be elastic and anchored to stationary posts, or a combination of elastic cord and springs may be used as desired.

The guide cord 59 is normally maintained in a horizontal position and prevented from deflecting by means of a series of pins 65 carried by a movable pin conveyor 66. These pins 65 engage beneath the guide cord 59 at a position intermediate adjacent buckets 50 and the pin conveyor 66 is driven from the drive more 54 so that movement of the pins 65 is synchronized with movement of the bucket 50.

When it is desired to dump a bucket 50 at the reject station, the dump lever 45 is pivoted upwardly as described previously into the path of travel of the dump pin 58 of bucket 50. This causes the bucket 50 to start pivoting in a clockwise direction about the mounting pins 56. At this time the forward guide pin 57 deflects the flexible guide cord 59 downwardly as shown in FIG. 12. However, the guide pins 65 prevent deflection of the guide cord beneath adjacent buckets so that the adjacent buckets are maintained horizontal. Dumping of the bucket and return of the bucket to its upright position is accomplished in exactly the same manner as previously described in conjunction with dumping of the bucket 28. This dumping operation is illustrated schematically in FIGS. 6 to 10 inclusive.

Figure 13:
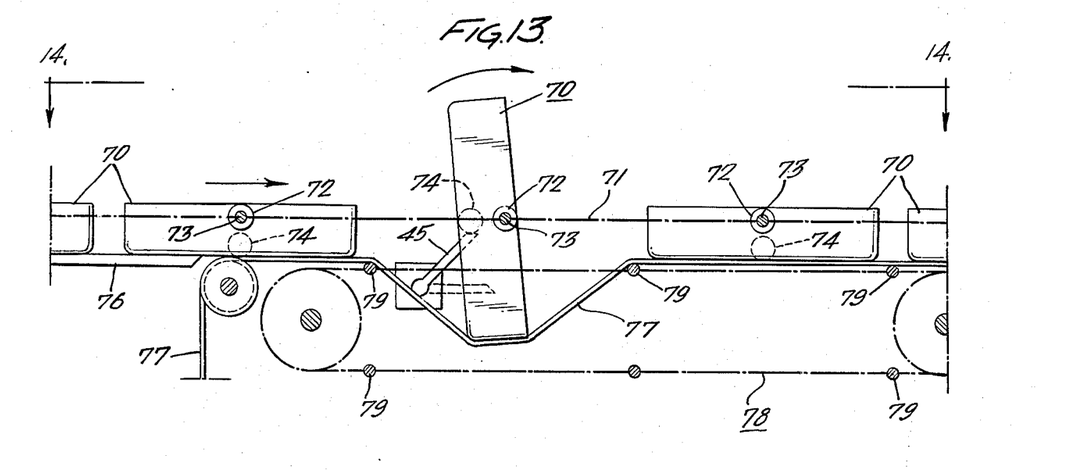
FIG. 13 is a fragmentary side elevational view of further modified form of stabilizing means of the present invention.
Figure 14:
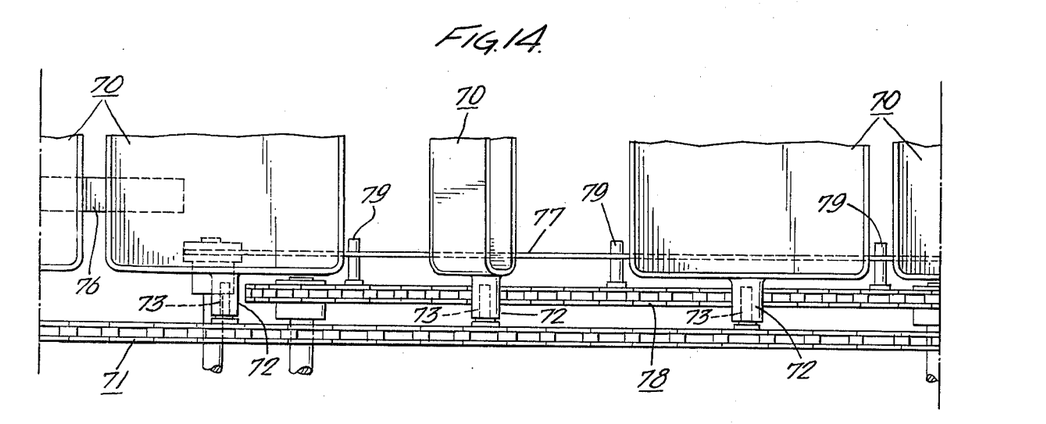
FIG. 14 is a plan view of the apparatus of FIG. 13, as veiwed from line 14—14, of FIG. 13.

FIGS. 13 and 14 illustrate still a further embodiment of the present invention in which it is unnecessary to use guide pins on the buckets to guide movement of the buckets. As illustrated in FIGS. 13 and 14, buckets 70 similar to the aforementioned buckets 28 and 50 are provided which are pivotally connected to endless conveyor chains 71, for example, by means of mounting lugs 72 which engage over mounting pins 73 carried by the conveyor chains 71. Similarly, a dumping lug 74 is provided on each bucket adapted to be engaged by the dump lever 45 described in conjunction with prior embodiments. In this embodimennt of the present invention, a guide rail 76 is provided spaced inwardly of the side edges of the buckets and which is engaged by the bottom of the buckets to prevent tilting or rocking movement of the buckets before the buckets enter the reject station and after the buckets leave the reject station. The guide rail 76 is interrupted at the rejet station to permit selected buckets to be dumped.

In this embodiment of the invention, movement of the buckets is guided at the reject station by means of a flexible guide cord 77 which engages beneath the lower surface of the bucket as illustrated in FIG. 14 in the same horizontal plane as the upper edge of the guide rail 76. The guide cord 77 is constructed and mounted in exactly the same manner as the guide cord 34 of the embodiment of FIGS. 1 to 10 inclusive of the invention with the exception that it is engaged beneath the lower edge of the bucket instead of beneath guide pins. Similarly, a driven pin conveyor 78 having a series of guide pins 79 thereon is provided, with the guide pins 79 engaging beneath the cord 77 intermediate adjacent buckets at the reject station. The pin conveyor 78 and guide pins 79 and movement of the pin conveyor 78 is the same as that of the aforementioned pin conveyor 41 and guide pins 44.

When the bucket 70 of this embodiment of the invention is dumped by upward movement of the dump lever 45, the bucket 70 is pivoted in the clockwise direction as illustrated in FIG. 13 of the drawings with the forward edge of the bucket 70 engaging and deflecting the guide cord 77 at a location between the guide pins 79 immediately in front of and immediately behind that bucket being dumped. Dumping of the bucket and return of the bucket to its horizontal position is accomplished in the same manner as described previously in conjunction with the embodiment of the invention shown in FIGS. 1 to 10.

Figure 15:
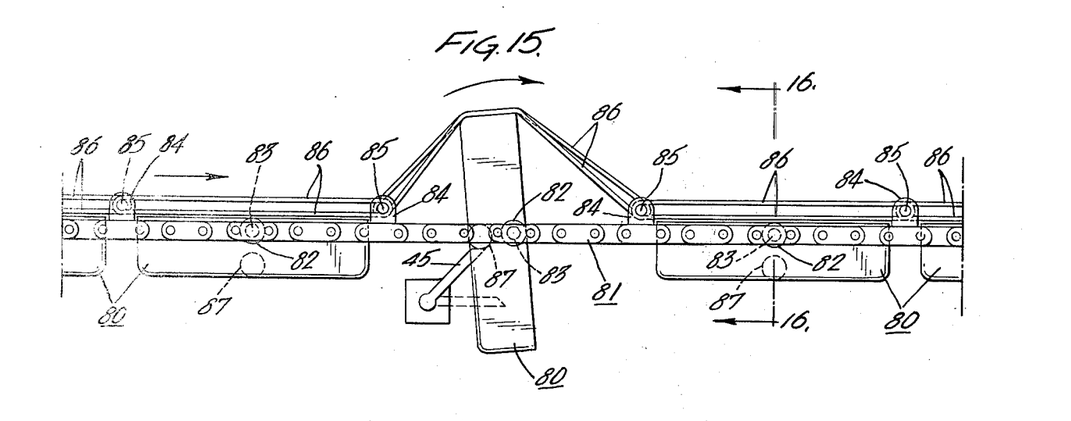
FIG. 15 is a fragmentary side elevational view of still a further guiding and stablilizing means for the bucket conveyor.
Figure 16:
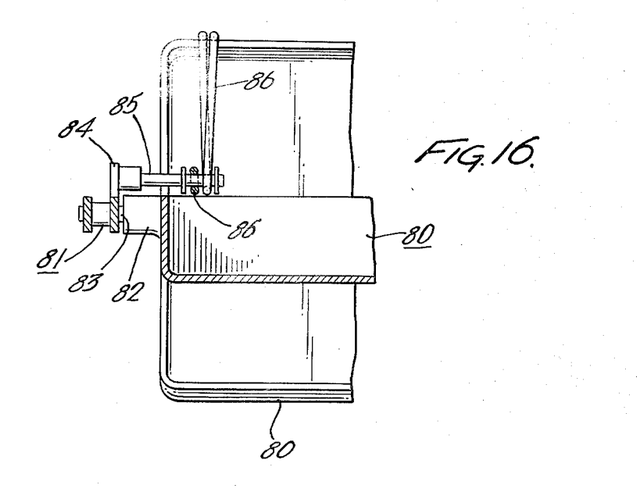
FIG. 16 is a fragmentary sectional view of the apparatus of FIG. 15, taken on line 16—16, FIG. 15.

FIGS. 15 and 16 illustrate still another embodiment of the present invention including means for maintaining the buckets of the bucket conveyor stable during movement along the upper run of the conveyor but permitting a selected bucket to be dumped at the reject station without affecting the stability of adjacent buckets. In this embodiment of the invention, a series of buckets 80 are provided which are pivotally mounted between spaced parallel conveyor chains 81 by means of mounting lugs 82 projecting outwardly from the upper portion of the mid-point of each bucket and engaging over mounting pins 83 carried by the conveyor chains 81.

Secured to one conveyor chain 81 intermediate each bucket of the bucket conveyor is an upwardly projecting link member 84 which carries an inwardly extending guide pin 85. The guide pin 85 projects inwardly at right angles to the direction of movement of the buckets and is positioned at a vertical level at or slightly above the upper edge of the buckets 80. A series of elastic guide cords or bands 86 are provided with each guide cord or band 86 passing about a pin 85 adjacent the front end of a bucket 80, extending over the bucket 80 in a longitudinal direction adjacent to and slightly inward of one side edge of the bucket and then passing about the pin 85 at the other end of the bucket 80.

This guide cord 86 is flexible and elastic and will normally engage the upper edges of the buckets 80 to prevent tilting or rocking movement of the buckets as they are carried along the upper run of the conveyor. However, when it is desired to dump a bucket at the reject station, the reject lever 45 engages a dumping lug 87 of a bucket 80. The bucket is then caused to pivot in the clockwise direction as shown in FIG. 15 and the trailing edge of the bucket engages and distorts the flexible guide cord 86 as shown. Continued dumping and return of the bucket after deflection of the guide cord 86 is the same as in the prior embodiments of this invention. If desired, the link portions 84 of the conveyor chain 81 may be directed downwardly instead of upwardly so that the guide cord passes beneath instead of above each of the buckets.

From the foregoing it will be observed that the present invention provides novel stabilizing means to guide pivotal buckets of a bucket conveyor in a positive manner past a reject station to prevent tilting or rocking of those buckets which are to pass the rejection station without being dumped. In addition it will be observed that the present invention provides novel dump mechanism for a pivoted bucket conveyor which will dump and return a bucket at a reject station without affecting the path of travel of adjacent buckets of the conveyor.

While particular embodiments of the present invention have been illustrated and described herein it is not intended to limit the invention to such a disclosure and changes and modifications may be incorporated and embodied therein within the scope of the following claims: I claim:

1. A pivoted bucket conveyor including conveyor means to move buckets along a predetermined path, means pivotally connecting the buckets to said conveyor to permit dumping of selected buckets at a predetermined location, dump means at said predetermined location to dump the contents of said selected buckets at said location by engaging and causing rotation of said buckets about the pivotal connection of said buckets to said conveyor, a first guide member extending generally parallel to said conveyor, guide means on said buckets in engagement with said guide member to prevent rotating movement of said buckets, said guide member being interrupted at said predetermined location to permit said selected buckets to be rotated and dumped at said location, and a yieldable flexible second guide member spanning the interrupted portion of said first guide member to guide buckets other than said selected buckets past said predetermined location.

2. Apparatus in accordance with claim 1 in which said second guide member comprises a flexible cord extending across the interrupted portion of said first guide member, and resilient means associated with said cord to normally maintain said cord in alignment with said first guide member and permit deflection of said cord when a selected bucket is dumped at said predetermined location.

3. Apparatus in accordance with claim 2 in which said resilient means comprises at least one extensible spring member connected to an end of said flexible cord.

4. Apparatus in accordance with claim 2 in which the extent of the interrupted portion of said first guide member is substantially greater than the length of a bucket, and movable support means between said bucket at said interrupted portion of said first guide member to engage and support said flexible cord between each bucket.

5. Apparatus in accordance with claim 4 in which said movable support means comprises a second endless conveyor traveling in the same direction and at the same speed as said bucket conveyor means, and a series of support pins carried by said second conveyor extending beneath and in engagement with said flexible cord between each bucket at said interrupted portion of said first guide member.

6. Apparatus in accordance with claim 5 including common drive means for said bucket conveyor and said second conveyor.

7. Apparatus in accordance with claim 1 wherein said dump means includes a projection extending outwardly from each bucket beneath the pivotal connection of the bucket to said conveyor, and a dump lever movable from a first position out of the path of travel of said projection to a second position in the path of travel of said projection, said dump lever in said second position operable to engage said bucket projection and cause rotation of said bucket toward a position to dump the contents of the same.

8. Apparatus in accordance with claim 7 wherein the guide means on said buckets includes a pair of guide pins projecting outwardly from said buckets adjacent the fron and rear of said buckets and riding along the upper surface of said first and said second guide members to guide movement of said buckets, the guide pin adjacent the front end of said bucket being adapted to distort said second guide member downwardly upon rotation of said bucket at said predetermined loacation.

9. Apparatus in accordance with claim 8 including first cam means to engage a bucket after it has been rotated by said dump lever and rotate said bucket further to a fully rotated position to dump the contents of the same, and second cam means to engage said bucket after it reaches its fully rotated position and return said bucket to an upright positon.

10. A pivoted bucket conveyor including conveyor means to move buckets along a predetermined path, means pivotally connecting the buckets to said conveyor to permit dumping of selected buckets at a predetermined location, dump means at said predetermined location to dump the contents of said selected buckets at said location by engaging and causing rotation of said buckets about the pivotal connection of said buckets to said conveyor, guide means extending lengthwise of said conveyor to engage and guide movement of said buckets and normally prevent pivotal movement of said buckets relative to said conveyor, at least a portion of said guide means including the portion thereof at said predetermined location being flexible and being deflected by an engaged portion of a selected bucket when said selected bucket is pivoted by said dump means, and movable support means between adjacent buckets in engagement with the flexible portion of said guide means to engage and support said flexible portion of said guide means between adjacent buckets.

11. Apparatus in accordance with claim 10 wherein said dump means includes a projection extending outwardly from each bucket beneath the pivotal connection of the bucket to said conveyor, and a dump lever movable from a first position out of the path of travel of said projection to a second position in the path of travel of said projection, said dump lever in said second position operable to engage said bucket projection and cause rotation of said bucket toward a position to dump the contents of the same .

12. Apparatus in accordance with claim 10 in which said flexible portion of said guide means comprises a flexible cord, and resilient means associated with said cord to normally maintain said cord in alignment with said buckets to guide the same and permit deflection of said cord when a selected bucket is dumped at said predetermined location.

13. Apparatus in accordance with claim 12 in which said resilient means comprises at least one extensible spring member connected to an end of said flexible cord.

14. Apparatus in accordance with claim 12 in which the movable support means comprises a series of support pins positioned between adjacent buckets at said flexible portion of said guide means in engagement with said flexible cord.

15. Apparatus in accordance with claim 14 in which said support pins are carried by and movable with said conveyor.

16. Apparatus in accordance with claim 14 in which said support pins are carried by a second endless conveyor traveling in the same direction and at the same speed as said bucket conveyor.

17. Apparatus in accordance with claim 10 in which said guide means comprises a flexible cord extending substantially the full length of the bucket conveyor, resilient means associated with said cord to maintain said cord in alignment with the buckets and permit deflection of the cord when a selected bucket is dumped at said predetermined location, and movable support means between each bucket to engage and support said flexible cord between each bucket.

18. Apparatus in accordance with claim 17 in which said movable support means comprises a second endless conveyor having an upper run extending substantially the full length of said flexible cord traveling in the same direction and at the same speed as the bucket conveyor, and a series of support pins carried by said second conveyor extending beneath and in engagement with said flexible cord between each bucket.

19. Apparatus in accordance with claim 10 in which said guide means comprises a rigid track member positioned in engagement with the under surface of the buckets of the upper run of the bucket conveyor, said track member being interrupted at said predetermined location, and a flexible cord spanning the interrupted portion of said track member to engage beneath and guide buckets at said predetermined location.

20. Apparatus in accordance with claim 19 including resilient means associated with said flexible cord to permit deflection of said cord when a selected bucket is dumped, and movable support means to engage and support said cord between each bucket at said predetermined location.

21. Apparatus in accordance with claim 10 in which said bucket conveyor comprises spaced parallel conveyor chains pivotally mounting the buckets therebetween, and said guide means is carried by one of said conveyor chains and normally maintains said buckets in a predetermined position relative to the conveyor chain, said guide means being resilient and permitting rotation of said buckets at said predetermined location.

22. Apparatus in accordance with claim 21 in which said guide means includes a series of support pins projecting inwardly from said one conveyor chain with a pin positioned intermediate each pair of adjacent buckets, and a flexible elastic cord extending between and carried by adjacent pins in engagement with the bucket between said adjacent pins to normally maintain said bucket in a predetermined position.

* * * * *